United States Patent [19]

Persyk et al.

[11] Patent Number: 4,618,775
[45] Date of Patent: Oct. 21, 1986

[54] RADIATION DETECTOR CIRCUIT WITH REAL TIME PHOTON COUNTING

[75] Inventors: Dennis E. Persyk, Barrington; Everett W. Stoub, Villa Park, both of Ill.

[73] Assignee: Siemens Gammasonics, Inc., Des Plaines, Ill.

[21] Appl. No.: 593,020

[22] Filed: Mar. 26, 1984

[51] Int. Cl.⁴ .............................................. G01T 1/208
[52] U.S. Cl. .................................................... 250/369
[58] Field of Search .................. 250/252.1, 369, 336.1, 250/363 S, 207; 377/50; 328/114

[56] References Cited

U.S. PATENT DOCUMENTS 3,525,047  8/1970  Schwartz ............................ 250/369
3,984,689 10/1976  Arseneau ............................ 250/369
4,152,596  5/1979  Marshall, III .................... 250/358.1

Primary Examiner—Alfred E. Smith
Assistant Examiner—Carolyn E. Fields
Attorney, Agent, or Firm—Mark H. Jay

[57] ABSTRACT

A radiation detector circuit, which comprises a radiation detector containing a scintillation crystal and a photomultiplier tube for real time photon measurement having a pulse output, and which also includes a plurality of pulse counters each having a pulse input and a count signal output. Between the pulse output of the photomultiplier tube and the pulse inputs of the pulse counters a time multiplexer is provided for connecting each pulse input of each counter in succeeding time periods with the pulse output of the photomultiplier tube. Furthermore, an evaluation circuit is connected with the count signal outputs of the counters for evaluating each count signal of each counter measured during each of said succeeding time periods in the sense of error estimates and trend analysis.

12 Claims, 3 Drawing Figures

RADIATION DETECTOR CIRCUIT WITH REAL TIME PHOTON COUNTING

BACKGROUND OF THE INVENTION

1. Field of the Invention

The invention relates to a radiation detector circuit with real time photon counting.

2. Description of the Prior Art

Radiation detectors comprising fast photomultiplier tubes with real time photon counting are for example described in the essay "Recent Work on Fast Photomultipliers Utilizing GaP(Cs) Dynodes", by Harold R. Krall et al., IEEE Transactions on Nuclear Science, June 1972, Vol. NS-19, No. 3, pages 45 to 49.

SUMMARY OF THE INVENTION

1. Objects

It is an object of this invention to provide a radiation detector circuit with real time photon counting which has negligible count rate losses.

It is another object of this invention to provide a radiation detector circuit with real time photon counting which allows an event identification, so that periodic updates of fitted parameters can be made, along with error estimates and trend analysis.

It is still another object of this invention to provide a radiation detector circuit with real time photon counting wherein parameters received from single event identification can be used in unfolding piled-up events to enhance event rate capability.

2. Summary

According to this invention a radiation detector circuit is provided, which comprises (a) a radiation detector containing
  (a1) a scintillation crystal; and
  (a2) a photomultiplier tube for real time photon measurement having a pulse output;
(b) a plurality of pulse counters each having a pulse input and a count signal output;
(c) a time multiplexer between the pulse output of the photomultiplier tube and the pulse inputs of the pulse counters for connecting each pulse input of each counter in succeeding time periods with the pulse output of the photomultiplier tube; and
(d) an evaluation circuit connected with the count signal outputs of the counters for evaluating each count signal of each counter measured during each of said succeeding time periods in the sense of error estimates and trend analysis.

According to this invention single photon counting technique, as described for example in Harold R. Krall et al's essay in IEEE Transactions on Nuclear Science, can be used to analyze a succession of singular photon events in sense of error estimates and trend analysis. This allows high-speed decision, whether or not a scintillation event can be regarded as valid. In case of pile-up it is not necessary to dump both the pile-up pulse and the preceding pulse. When a pile-up occurs, decision can be made within the rise time of the pile-up pulse to continue evaluation of both pulses separately from each, instead of dumping both pulses. This enhances event rate capability enormously.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENT

It can be assumed that under normal circumstances about 7.5 photoelectrons per KeV of gamma ray energy (for example, at 140 KeV, about 1000) are detected in about 500 ns. If all these photoelectrons (pe) would come out uniformly distributed over the 500 ns a resolution of 500 ns/1000 pe=500 ps would be needed Unfortunately, the photoelectrons do not come out uniformly distributed. Due to this a resolution is needed which is <500 ps.

The above mentioned Harold R. Krall et al. essay describes photomultipliers having risetimes <300 ps. Those photomultipliers are suitable for real time photon counting.

Figure 1:
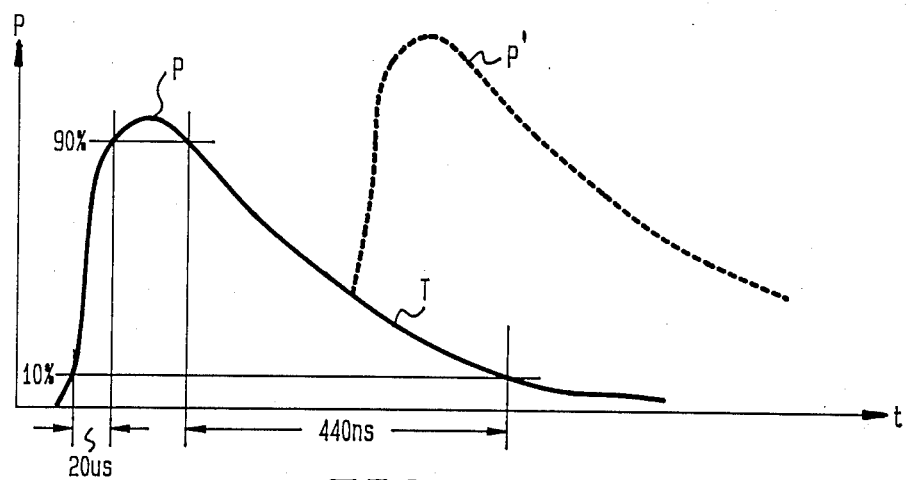
FIG. 1 is a pulse diagram showing a pulse-pile-up situation.

FIG. 1 illustrates a typical output pulse P of a conventional photomultiplier tube. This pulse, which has for example a risetime of about 20 ns and a decay time of about 440 ns, is the result of an observation of about 1000 photoelectrons as mentioned above.

In FIG. 1 there is also shown a pulse P' piled-up at the tail of pulse P.

Figure 2:
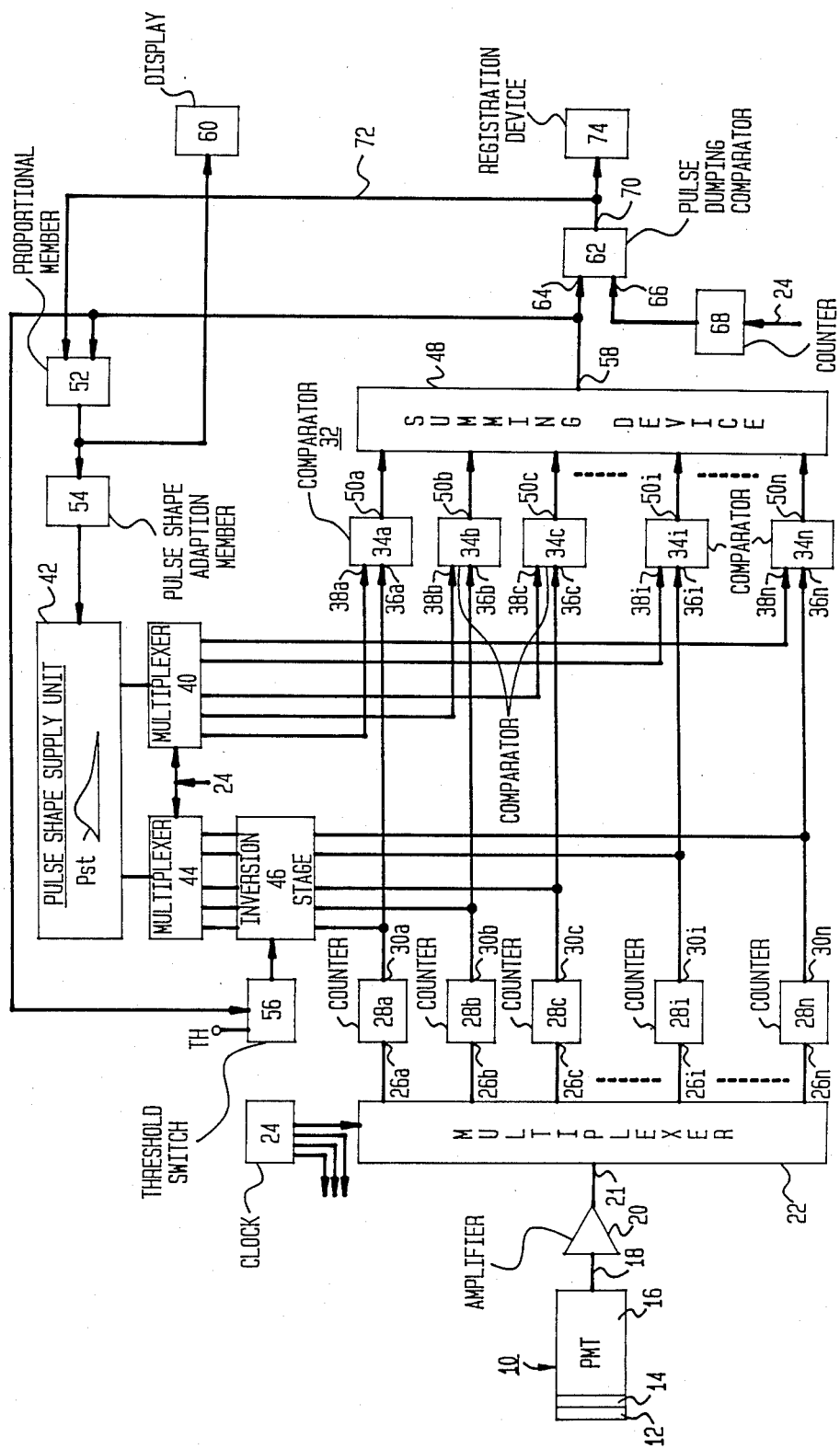
FIG. 2 is a block circuit of the invention.

FIG. 2 depicts a radiation detector head 10 comprising a scintillation crystal 12, a light conductor 14 and a single photoelectron photomultiplier tube 16. The pulse output 18 of the photomultiplier tube 16 is connected via a fast amplifier 20 with the input 21 of a single photoelectron pulse time multiplexer 22. The single photoelectron pulse time multiplexer 22 connects in dependance on clock pulses of a clock 24 the pulse inputs 26a to 26n of n pulse counters 28a to 28n with the pulse output 18 of the photomultiplier tube 16 via amplifier 20 in succeeding time periods.

In this case each time period is for example 5 ns (however other time periods can be used if desired). The number of counters is for example n=100.

The counters 28a to 28n have count signal outputs 30a to 30n which are connected with an evaluation circuit 32. The evaluation circuit 32 in case of FIG. 2 comprises n=100 comparators 34a to 34n (for each counter one comparator) having a first comparator input 36a to 36n connected with a corresponding count signal output of the counters and a second comparator input 38a to 38n connected with a first pulse shape time multiplexer 40 of a pulse shape supply unit 42.

The pulse shape supply unit 42 has a stored in pulse shape $P_{st}$. At the beginning of each measurement the stored in pulse shape $P_{st}$ always corresponds with a norm pulse shape of a unit pulse (e.g. 1 KeV pulse).

The pulse shape supply unit 42 also comprises a second pulse shape time multiplexer 44, the outputs of which are connected via a polarity inversion stage 46 with the first comparator inputs 36a to 36n, as indicated in FIG. 1.

The evaluation circuit 32 further comprises a summing device 48 for the output signals at the outputs 50a to 50n of the comparators 34a to 34n, a proportional member 52 for the output signal of the summing device 48, a pulse shape adaption member 54 for adaption of pulse shape $P_{st}$ of the pulse shape supply unit 42 dependent on the output signal of the proportional member 52 and a threshold switch member 56 for activating the polarity inversion stage 46 of the second pulse shape time multiplexer 44 when an output signal at the output 58 of the summing device 48 exceeds a predetermined threshold TH.

Finally, the evaluation circuit 32 also comprises a digital display unit 60 (e.g. multichannel pulse analyzer) connected with the output of the proportional member 52, and a pulse dumping comparator 62. The pulse dumping comparator 62 has a first input 64 which is connected with the output 58 of the summing device 48. It also has a second input 66 which is connected with a counter 68 for clock pulses of clock 24.

The output 70 of the dumping comparator 62 controls the proportional member 52 in the sense of dumping the transfer of the output signal of the summing device 48 to the pulse shape adaption member 54, when the output signal of the summing device 48 at comparator input 64 exceeds a predetermined threshold supplied at comparator input 66 by means of counter 68.

Under normal conditions, i.e. when a pulse P alone is going to be processed or a pulse P in combination with a pile-up pulse P' is going to be evaluated, wherein the pile-up pulse P' is clearly delayed with respect to the pulse P, the output signal of summing device 48 is always below the threshold. No dumping signal is generated for the proportional member 52 normally in this case.

Under abnormal conditions, however, it may happen that two pulses P and P' appear at approximately the same time, so that they cannot be separated. In such a case the output signal of the summing device 48 will exceed the threshold and comparator 62 will produce a dumping signal for proportional member 52.

The threshold generated by the counter 68 depends on the number of counted clock pulses of clock 24. At the beginning of each pulse P the threshold has a value which is above the peak amplitude of a normal pulse. With each succeeding clock pulse the threshold value increases. Due to this a pulse P' piled up on the preceding pulse P will generate a dumping signal when it appears simultaneously with or shortly after preceding pulse P since at this time the threshold is relatively low. However, a dumping signal will not be produced when the pile-up pulse P' is sufficiently delayed with respect to the preceding pulse P, since then the threshold is relatively high.

Each appearance of a dumping signal at output 70 of comparator 62 is registered at a registration device 74.

The operation of the circuit of FIG. 2 is as follows:

As mentioned above, at the beginning of a measurement the pulse shape $P_{st}$ stored in the pulse shape supply unit 42 has the shape of the unit pulse.

With starting of a measurement the single photoelectron pulse time multiplexer 22 starts multiplexing the single photoelectron output pulses of the radiation detector 10 in 5 ns time intervals. The single photoelectron pulses occurring during each 5 ns time interval are counted in the counters 28a to 28n, respectively.

Also with starting of a measurement the first pulse shape time multiplexer 40 and the second pulse shape time multiplexer 44 of pulse shape supply unit 42 start time multiplexing the stored in pulse shape $P_{st}$ (of unit pulse). The output signals of the first pulse shape time multiplexer 40 are supplied to the respective second inputs 38a to 38n of the comparators 34a to 34n. However, the output signals of the second pulse shape multiplexer 44 are prevented from being supplied to the first comparator inputs 36a to 36n as long as polarity inversion stage 56 has not been activated by the threshold switch member 56.

The count output signals of counters 28a to 28n and the corresponding output signals of the first pulse shape time multiplexer 40 are compared with each other by comparators 34a to 34n. A zero signal is produced by a comparator 34a to 34n as long as both input signals do not differ from each other. However, when a difference between the two input signals has been registered by a comparator 34a to 34n a comparator output signal is generated according to the amount and polarity of the difference.

All output signals of comparators 34a to 34n are continuously summed up in summing device 48. The summing signal at the output 58 is fed to the pulse dumping comparator 62, as described above. It is also supplied to the proportional member 52 which (in case of absence of a dumping signal of dumping comparator 62) produces a signal proportional to the summing signal. This proportional signal controls the pulse shape adaption member 54 to change pulse shape $P_{st}$ (of unit pulse) stored in pulse shape supply unit in the sense of adapting the original shape pulse to the shape of the pulse P which is going to be investigated.

In case of FIG. 1, pulse P is valid. However, there is a pulse P' piled-up on pulse P's tail T.

Figure 3:
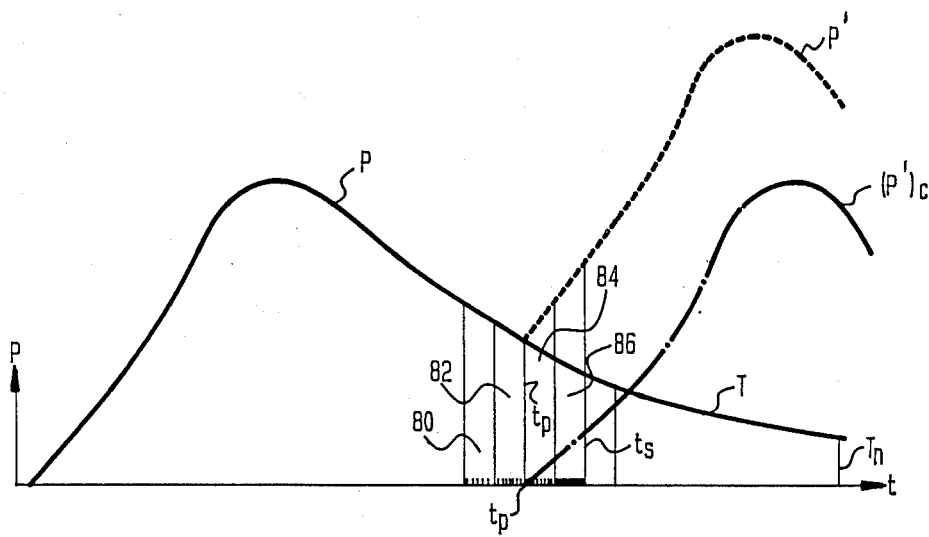
FIG. 3 is another pulse diagram, indicating an abrupt jump in the number of photoelectrons occurring in a pulse-pile-up situation.

As illustrated in FIG. 3 the occurrance of pile-up pulse P' will be registered by an abrupt increase of the number of photoelectron pulses starting with the rise of pulse P'. For example, as indicated in FIG. 3, the 5 ns time interval 80 of tail T of pulse P contains five and the 5 ns time interval 82 includes four photoelectron pulses. The succeeding two 5 ns time intervals 84, 86, however comprise ten and twelve photoelectron pulses, respectively, i.e. more than will normally occur during the rise time of a pulse P (all numbers are for the purpose of illustration only).

Due to the abrupt jump at tp the output signal at output 58 of the summing device 48 will exceed the threshold TH of threshold switch member 56, which is adjusted to the highest number of photoelectron pulses which normally can be expected during the rise time of a normal pulse P (e.g. $<$ ten photoelectrons for the above mentioned example). This enforces threshold switch member 56 (for example at time $T_s=t_p+10$ ns if not already at $t_s=t_p+5$ ns ) to activate the polarity inversion stage 46. At the time $t_s$ single photoelectron pulse time multiplexer 22 is for example in position of counter 28i. The second pulse shape time multiplexer 44 in combination with polarity inversion stage 46 now starts to substract the tail values $T_i$ to $T_n$ of pulse P (FIG. 3) from the succeeding output signals of counters 28i to 28n. The resulting signal $(P')_c$ is pulse P' cleaned from the tail T of preceding pulse P (including a minor error between $t_p$ and $t_s$).

Under these circumstances, the circuit of FIG. 2 allows a rapid event identification, so that periodic updates of fitted parameters can be made (continuously adapting pulse shape $P_{st}$ in pulse shape supply unit 42), along with error estimates and trend analysis (indication at digital display unit 60 and registration device 74). Also parameters received from single event identification can be used in unfolding pile-up events to enhance even rate capability.

Having thus described the invention with particular reference to the preferred forms thereof, it will be obvious to those skilled in the art to which the invention pertains, after understanding the invention, that various changes and modifications may be made therein without departing from the spirit and scope of the invention as defined by the claims appended hereto.

What is claimed is:

1. A radiation detector circuit, comprising:
   (a) a radiation detector containing
      (a1) a scintillation crystal; and
      (a2) a photomultiplier tube of a type adapted for real time photon measurement and having a pulse output;
   (b) a plurality of pulse counters each having a pulse input and a count signal output;
   (c) a time multiplexer means between the pulse output of the photomultiplier tube and the pulse inputs of the pulse counters for connecting each pulse input of each counter in succeeding time periods with the pulse output of the photomultiplier tube; and
   (d) an evaluation circuit means connected with the count signal outputs of the counters for evaluating each count signal of each counter measured during each of said succeeding tim eperiods.

2. The radiation detector circuit according to claim 1, wherein said evaluation circuit means comprises:
   (a) a plurality of comparators having each a first and a second input and an output;
   (b) a pulse shape supply unit having a stored in pulse shape; and
   (c) a pulse shape time multiplexer means connected with the pulse shape supply unit for multiplexing the stored in pulse shape, said pulse shape time multiplexer means having a number of outputs which corresponds with the number of second inputs of the comparators;
   wherein each count signal output of the counters is connected with a corresponding first input an each output of the pulse shape time multiplexer means is connected with a corresponding second input of the comparators, such that the comparators continuously compare the count output signals of the counters with the corresponding parts of the pulse shape stored in the pulse shape supply unit for generating comparator output signals of the amounts and polarities of the differences between the input signals.

3. The radiation detector circuit according to claim 2, wherein the time multiplexer means and the pulse shape time multiplexer means are synchronously clocked by the clock pulses of a clock.

4. The radiation detector circuit according to claim 3, further comprising a pulse dumping comparator means connected with the outputs of the comparators and a clock pulse counter for the clock pulses of the clock, and operating in such a manner that further evaluation of the comparator output signals is cut off when the sum of the comparator output signals exceeds the count output signal of the clock pulse counter.

5. The radiation detector circuit according to claim 4, further comprising a registration means for registering the dumping signals of the pulse dumping comparator means.

6. The radiation detector circuit according to claim 2, further comprising a pulse shape adaption member means connected between the outputs of the comparators and the pulse shape supply unit and operating in such a manner as to adapt the pulse shape stored in the pulse shape supply unit to the pulse shape of the actual pulse under investigation.

7. The radiation detector circuit according to claim 6, further comprising a summing device connected between the outputs of the comparators and the pulse shape adaption member means and adding the output signals of the comparators.

8. The radiation detector circuit according to claim 7, further comprising a proportional member connected between an output of the summing device and the pulse shape adaption member means.

9. The radiation detector circuit according to claim 8, further comprising a digital display unit connected with the output of the porportional member.

10. The radiation detector circuit according to claim 2, further comprising
    (a) a second pulse shape time multiplexer means connected with the pulse shape supply unit;
    (b) means for detecting an abrupt change in the output signals of the comparators; and
    (c) means connected between the detecting means and the second pulse shape time multiplexer means for controlling the second pulse shape time multiplexer means to superimpose remaining parts of the pulse shape stored in the pulse shape supply unit to the counter output pulses of the counters in the sense of a subtraction.

11. The radiation detector circuit according to claim 10, wherein the detecting means comprises a threshold switch member which generates a switching signal when the sum of the output signals of the comparators exceeds a given threshold.

12. The radiation detector circuit according to claim 11, wherein the controlling means comprises a polarity inversion stage for the output signals of the second pulse shape time multiplexer, means having outputs connected with the count signal outputs of the counters, respectively, said polarity inversion stage being designated for being switched on at the occurrence of a switching signal of the threshold switch member.

* * * * *